(No Model.)
T. C. O. SHERK.
SMOKE BELL.
No. 605,234.　　　　　　　　Patented June 7, 1898.
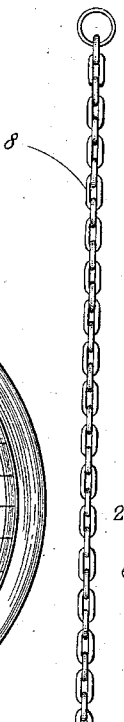
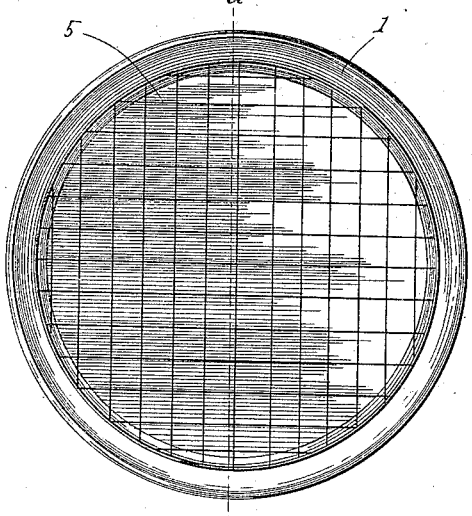
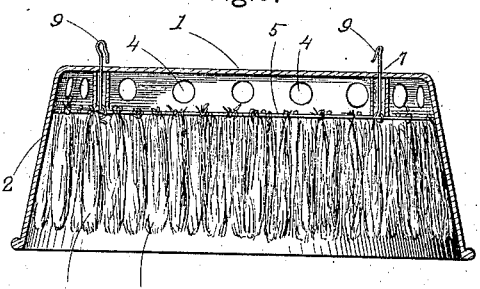
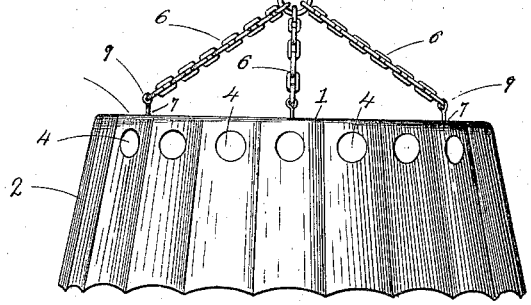
Witnesses,　　　　　　　Truman C. O. Sherk, Inventor.
　　　　　　　　　　　　By James Sangster, Attorney.

UNITED STATES PATENT OFFICE.

TRUMAN C. O. SHERK, OF BUFFALO, NEW YORK.

SMOKE-BELL.

SPECIFICATION forming part of Letters Patent No. 605,234, dated June 7, 1898.

Application filed December 14, 1897. Serial No. 661,810. (No model.)

*To all whom it may concern:*

Be it known that I, TRUMAN C. O. SHERK, a citizen of the United States, residing at Buffalo, in the county of Erie and State of New York, have invented certain new and useful Improvements in Smoke-Bells, of which the following is a specification.

My invention relates to an improved smoke-bell adapted to be supported above the flame of a gas-burner or lamp; and its object is to provide a cheap, simple, and easily-constructed device for catching and retaining the smoke or unconsumed particles thrown off by the flame, and thereby preventing the discoloring of the wall-paper or the contamination of the air.

It also relates to certain details of construction, all of which will be fully and clearly hereinafter described and claimed, reference being had to the accompanying drawings, in which—

Figure 1 represents a side elevation of the device complete. Fig. 2 is an inside face view, the fireproof material being omitted, so as to expose the netting upon which it is suspended. Fig. 3 represents a vertical central section through the device complete on or about line $a\ a$, Fig. 2.

Referring to the said drawings for the details of construction, in which like numerals designate like parts, 1 designates the circular bell, which is preferably stamped or pressed into shape from one portion of material. It may be constructed with its flaring side portion 2 shaped in the scalloped form shown in Fig. 1, the plain form shown in Fig. 3, or in a variety of other similar forms without departing from the nature of my invention. A series of holes or openings 4 are arranged around the side portion of the bell near the juncture with the top 3. A net 5, preferably formed of interwoven wire, is secured at its edge to and supported within the interior of the bell, substantially parallel with the top 3 thereof and slightly below the series of openings 4. From the net 5 are suspended or hung pendent a series of loose portions of fireproof material 5ª having the property of catching and retaining the unconsumed particles thrown off by the flame. I preferably employ asbestos for this purpose, as it possesses to the greatest degree the qualities required. The fireproof material may be secured to the netting in any well-known manner. I preferably employ a wire having its ends twisted around a portion of the netting and the upper end of the portion of fireproof material, respectively.

This device is suspended over the flame of a gas-jet or lamp by means of a chain or similar support, and my preferred form of chain support is illustrated in Fig. 1 of the drawings, in which several short portions 6 of chain are secured at their lower ends to the bell at the points 7 on the top thereof and have their upper ends bunched and secured to the lower end of a longer chain portion 8, the upper end of which is secured to the ceiling or any suitable support.

To simplify the construction, I preferably form a series of holes or openings in the top of the bell at the points 7 and introduce wire supporting devices through said openings. The upper ends 9 of these devices are the shape of a hook or ring, over or through which the lower loop of the chain portions are slipped, and their lower ends are twisted or bent around portions of the interwoven net to sustain the same. With this construction the net and its pendent fireproof material can be readily detached from the supports and the supports withdrawn through the opening, thereby dismounting the smoke-bell for packing or other purposes.

In practice the bell is suspended from a suitable support, as heretofore described, vertically above and at a suitable distance from the flame, and the hot gases, smoke, and particles of unconsumed and partially-unconsumed matter ascend vertically to and into the bell, pass through the loosely-suspended fireproof material, and then flow into the open air through the openings 4, the fireproof material acting as a filtering agent and separating and removing the particles of matter therefrom during their passage through.

While the above describes the preferred form of my invention, it is obvious that changes in the proportion, form, or general arrangement and construction of the various parts may be made without departing therefrom.

I claim as my invention—

1. A smoke-bell, comprising a bell portion, a suspending medium, an asbestos-supporting device, and devices for detachably securing the suspending medium to the bell portion and the asbestos-supporting device within the bell portion.

2. A smoke-bell, comprising a bell portion provided with a series of draft-openings, a net suspended within said bell portion and a series of asbestos portions loosely suspended from said net.

3. A smoke-bell, comprising a bell portion, provided with a series of openings in its top, a net, a series of asbestos portions loosely suspended from said net, a supporting chain or chains, and devices passed through the openings in the top of the bell portion for detachably securing the chain or chains to the bell portion and the net within the interior of the bell portion, as set forth.

TRUMAN C. O. SHERK.

Witnesses:
  A. J. SANGSTER,
  G. A. NEUBAUER.